United States Patent [19]

Kagoshima et al.

[11] Patent Number: 5,198,286

[45] Date of Patent: Mar. 30, 1993

[54] PANEL REINFORCING-SHEET MATERIAL AND VEHICLE OUTER PANEL STRUCTURE USING THE SAME

[75] Inventors: Yutaka Kagoshima, Yokohama; Toshio Nagase, Tsukuba; Takeo Kobayashi, Yokohama, all of Japan

[73] Assignee: Nippon Zeon Co., Ltd., Tokyo, Japan

[21] Appl. No.: 896,576

[22] Filed: Jun. 10, 1992

[30] Foreign Application Priority Data

Jun. 11, 1991 [JP] Japan .................................. 3-166441

[51] Int. Cl.⁵ .............................................. B32B 3/26
[52] U.S. Cl. ................................... 428/246; 428/265; 428/304.4; 428/319.1; 428/319.3; 428/413; 428/414
[58] Field of Search ................. 428/246, 265, 304.4, 428/319.1, 319.3, 413, 414

[56] References Cited

U.S. PATENT DOCUMENTS 4,378,395  3/1983  Asoshina et al. ............... 428/319.3
4,399,174  8/1983  Tanaka et al. .................... 428/319.3

FOREIGN PATENT DOCUMENTS 2019313  10/1979  United Kingdom ............ 428/319.9

*Primary Examiner*—William J. Van Balen
*Attorney, Agent, or Firm*—Sherman and Shalloway

[57] ABSTRACT

According to the present invention there is provided a panel-reinforcing sheet material having a multi-layered structure consisting of a first layer, a second layer and, optionally, a third layer, the first layer consisting of a foamable composition comprising, as essential components, (A) epoxy resin, (B) a rubber elastomer or a halogen-free powder thermoplastic resin of 150 μm or less in average particle diameter, (C) a plasticizer, (D) a high-temperature-decomposition type blowing agent and (E) a heat-activaiton type hardener for epoxy resin, the component (A)/component (B) weight ratio being 0.2-5, the second layer consisting of a cloth, and the third layer consisting of a thin metal film of 50 μm or less in thickness. This sheet material has good adhesion to oily surfaces and, when subjected to blowing and hardening, gives a sheet of good heat resistance, and can therefore be suitably used for the reinforcement of vehicle outer panel before electrodeposition.

3 Claims, 1 Drawing Sheet

PANEL REINFORCING-SHEET MATERIAL AND VEHICLE OUTER PANEL STRUCTURE USING THE SAME

The present invention relates to a panel-reinforcing sheet material and a vehicle outer panel structure using the sheet material. More particularly, the present invention relates to a panel-reinforcing sheet material of good workability which has excellent adhesion to oily surfaces, which gives rise to blowing and hardening when heated, to give a reinforcing foamed sheet having good heat resistance, heat insulation, reinforcing action and lightweightness, sand which is suitably used for reinforcement of metal panels before electrodeposition, in particular, as well as to a vehicle outer panel structure which is reinforced by the above sheet material and which has excellent heat insulation, excellent rigidity and lightweightness.

Metal panels have heretofore been used as structures widely in various fields such as automobiles, buildings, furnitures, etc. These metal panels have characteristics of excellent strength and excellent durability but have drawbacks of high specific gravity, high thermal conductivity (i.e. poor heat insulation), etc.

Meanwhile, in recent years, use of thinner panels has been pushed forward for lighter weight, in vehicles, building materials, etc., in view of resource saving and energy saving. This results in reduced strength, which invites, in the case of, for example, automobiles, insufficient surface tensional rigidity and insufficient solid appearance.

In order to solve these problems, there was proposed a method which comprises attaching, for example, a sheet composed mainly of an epoxy resin, to part of a door panel and then hardening the attached sheet in a paint drying furnace used in automobile production, to obtain a reinforced door panel [Japanese Patent Application Kokai (Laid-Open) No. 101659/1980]. This method, however, has a drawback in that the attaching of the sheet to part of the door panel gives no sufficient reinforcing effect but the attaching to the whole surface fails to achieve the object of lighter weight.

Also in automobiles, building materials, etc., it is under way as a method for preventing the inflow or outflow of heat from or to outside, to apply to the back side of a panel a heat-insulating material such as glass wool, felt, foamed urethane or the like. This method is effective for higher air-conditioning effect or prevention of dew condensation, but has a problem in that the heat-insulating material used is a shaped article and large, requiring a long time for fixation of the material.

In order to solve these problems, there were proposed various processes for producing a vehicle outer panel structure having all of lightweightness, heat insulation and high strength. There were proposed, for example, (1) a process which comprises, for giving high rigidity to obtain solid appearance, attaching to the back side of a panel a plastisol obtained by adding a liquid epoxy resin and a heat-activation type hardener to a composition comprising a vinyl chloride resin for paste, a plasticizer, a blowing agent, etc., by coating or in the form of a semi-geled sheet and then heating the resulting panel to allow the plastisol to give rise to blowing and hardening [Japanese Patent Application Kokai (Laid-Open) No. 28475/1988], and (2) an process which comprises attaching to the backside of a panel sheet material having a three-layered structure consisting of a first layer which is a foamable composition comprising, as essential components, a vinyl chloride resin, a plasticizer, a high-temperature-decomposition type blowing agent, an epoxy resin and a heat-activation type hardener for epoxy resin, a second layer which is a cloth, and a third layer which is a thin metal film, and then heating the resulting panel to allow the sheet material to give resin to blowing and hardening [Japanese Patent Application Kokai (Laid-Open) No. 272515/1988].

In these processes, however, the plastisol or the foamable composition contains a vinyl chloride resin as a thermoplastic resin, and therefore has poor adhesion to oily surfaces and, when heated to give rise to blowing and hardening, gives a sheet of poor heat resistance. Hence, the processes are applicable to vehicle outer panels after electrodeposition but unapplicable to vehicle outer panels before electrodeposition.

In the automobile industry, attaching of reinforcing sheet material to vehicle outer panel before electrodeposition is strongly desired for higher productivity or for use of such a reinforcing sheet material to as many applications as possible. The reinforcing sheet material to be attached to vehicle outer panels before electrodeposition is desired to have excellent adhesion to oily surfaces (vehicle outer panels are ordinarily coated with a rust preventive oil, before subjected to electrodeposition) and heat resistance capable of withstanding temperatures of 180° C. or above (temperatures employed during electrodeposition).

Hence, an object of the present invention is to provide a panel-reinforcing sheet material of good workability which has excellent adhesion to oily surfaces, which gives rise to blowing and hardening when heated, to give a reinforcing foamed sheet having good heat resistance, heat insulation, reinforcing action and lightweightness, and which is suitably used for reinforcement of metal panels before electrodeposition, in particular.

Another object of the present invention is to provide a vehicle outer panel structure which is reinforced by the above sheet material and which has excellent heat insulation, excellent rigidity and lightweightness.

The present inventors made study and found that the above objects can be achieved by a panel-reinforcing sheet material having a multi-layered structure consisting of a first layer which is a foamable composition of specific formulation, a second layer which is a fiber-made cloth and, optionally, a third layer which is a thin metal film of specific thickness, and also by a vehicle outer panel structure which is produced by attaching the above panel-reinforcing sheet material to the back side of a vehicle outer panel so that the first layer of the sheet material contacts with the back side and then heating the resulting structure to allow the sheet material to give rise to blowing and hardening.

According to the present invention, there is provided a panel-reinforcing sheet material having a multi-layered structure consisting of a first layer, a second layer and, optionally, a third layer, the first layer consisting of a foamable composition comprising, as essential components, (A) an epoxy resin, (B) at least one substance selected from a rubber elastomer insoluble in the epoxy resin at room temperature but miscible with the epoxy resin at temperatures of 80°–150° C. to form a dispersion and a halogen-free powdery thermoplastic resin of 150 μm or less in average particle diameter insoluble in the epoxy resin at room temperature but miscible with the epoxy resin at temperatures of 80°-150° C. to form a dispersion, (C) a plasticizer, (D) a high-temperature-decomposition type blowing agent and (E) a heat-activation type hardener for epoxy resin, the component (A)/component (E) weight ratio being 0.2-5, the second layer consisting of a fiber-made cloth, and the third layer consisting of a thin metal film of 50 μm or less in thickness. The present invention further provides a vehicle outer panel structure which is produced by attaching the above panel-reinforcing sheet material to the back side of a vehicle outer panel so that the first layer of the sheet material contacts with the back side and then heating the resulting structure to allow the sheet material to give rise to blowing and hardening.

The present invention is hereinafter described in detail.

In the panel-reinforcing sheet material of the present invention, the foamable composition used as the first layer of the sheet material comprises an epoxy resin as the component (A). This epoxy resin has at least one epoxy group in the molecule. As such an epoxy resin, there can be mentioned, for example, glycidyl ether type epoxy resins, e.g., diglycidyl ether or bisphenol A, bisphenol F, resorcin or hydrogenated bisphenol A and polyglycidyl ether of phenol novolac resin or cresol novolac resin; glycidyl ester type epoxy resins, e.g., glycidyl ester of phthalic acid, hexahydrophthalic acid or tetrahydrophthalic acid; glycidylamine type epoxy resins; and linear aliphatic epoxide type epoxy resins. These epoxy resins can be used alone or in combination of two or more, depending upon the desired properties of the foamable composition.

In the foamable composition, there is used, as the component (B), a rubber elastomer insoluble in the component (A) (epoxy resin) at room temperature but miscible with the epoxy resin at temperatures of 80°-150° C. to form a dispersion and/or a halogen-free thermoplastic resin insoluble in the component (A) (epoxy resin) at room temperature but miscible with the epoxy resin at temperatures of 80°-150° C. to form a dispersion. In this case, the rubber elastomer can be a solid or a viscous liquid, while the thermoplastic resin must be in the form of a powder having an average particle diameter of 150 μm or less. It is preferable that the rubber elastomer and/or the thermoplastic resin, when the foamable composition is heated to 150° C. or above and melted, can uniformly and stably mix with the component (A) (epoxy resin) and can allow the composition to maintain a stable melt viscosity. As such rubber elastomer and thermoplastic resin, there can be mentioned rubber elastomers such as chloroprene rubber, butadiene-acrylonitrile rubber, carboxyl-modified butadiene-acrylonitrile rubber, epoxy-modified butadiene-acrylonitrile rubber, butadiene rubber, isoprene rubber and the like; and thermoplastic resins such as ethylene-vinyl acetate copolymer, polyphenylene ether, ethylene-vinyl alcohol copolymer, acrylonitrile-styrene copolymer, polyamide, polyvinyl butyral, polyvinyl acetal, poly(meth)acrylate type resins [e.g. polymethyl (meth)acrylate], acrylonitrile-butadiene-styrene copolymer, methyl methacrylate-butadiene-styrene copolymer, polystyrene and the like. These elastomers and resins can be used alone or in combination of two or more. Of them, poly(meth)acrylate type resins are particularly preferable.

The compounding proportion of the component (A) (epoxy resin) and the component (B) (rubber elastomer and/or thermoplastic resin) must be component (A)/component (B) weight ratio=0.2-5, preferably 0.4-4. When the weight ratio is smaller than 0.2, it is difficult to obtain a hard foamed material. When the weight ratio is larger than 5, the amount of heat generation during hardening reaction is large, which invites decomposition of the component (B) and hinders expansion caused by the decomposition gas generated from the blowing agent, making it difficult to obtain a foamed material of high expansion ratio.

In the foamable composition, the plasticizer used as the component (C) has an action of allowing the component (B) (rubber elastomer and/or thermoplastic resin) to stably mix with the component (A) (epoxy resin) to form a dispersion, and also has a role of controlling the melt viscosity of the foamable composition. As the plasticizer, there can be mentioned those conventionally known, for example, phthalic acid esters such as dioctyl phthalate, dibutyl phthalate and the like; phosphoric acid esters such as tricresyl phosphate and the like; fatty acid esters such as dioctyl adipate, dioctyl sebacate and the like; polyesters such as ethylene glycol/adipic acid condensate and the like; trimellitic acid triesters such as trioctyl trimellitate and the like; chlorinated paraffin; alkylbenzenese; and high-molecular aromatics. These plasticizers can be used alone or in combination of two or more.

The amount of the plasticizer used has no particular restriction but is ordinarily selected in the range of 10-150 parts by weight per 100 parts by weight of the component (B). When the amount is less than 10 parts by weight, no sufficient expansion ratio can be obtained. When the amount is more than 150 parts by weight, the resulting reinforcing sheet, when heated, gives low hardness and fails to exhibit sufficient reinforcing effect.

In the foamable composition, as the high-temperature-decomposition type blowing agent used as the component (D), there can be used an organic blowing agent, an inorganic blowing agent, high-temperature-expansion type microcapsules, etc. As the organic blowing agent, there can be mentioned, for example, azodicarbonamide, p-toluenesulfonyl hydrazide, dinitrosopentamethylenetetramine, and 4,4'-oxybisbenzenesulfonyl hydrazide. The decomposition temperatures of these organic blowing agents can be desirably controlled by the addition of urea, zinc compound, lead compound or the like. As the inorganic blowing agent, there can be mentioned, for example, sodium hydrogencarbonate and sodium borohydride. As the high-temperature-expansion type microcapsules, there can be mentioned, for example, those obtained by encapsulating a low-boiling hydrocarbon in a vinylidene chloride resin.

In the present invention, any of the organic blowing agent, the inorganic blowing agent, the high-temperature-expension type microcapsules, etc. can be used. However, an organic blowing agent having a decomposition temperature of 100° C. or above is particularly preferably in view of the appearance of foamed material, the homogeneity and denseness of foam cells, etc. With a blowing agent having a decomposition temperature lower than 100° C., it is difficult to obtain a foamed material of homogeneous quality because blowing starts already at the time of sheeting or because the resin melts insufficiently during blowing in the heating furnace and this invites gas leakage and insufficient expansion ratio.

The amount of the blowing agent used is ordinarily selected in the range of 0.5-15 parts by weight per 100 parts by weight of the component (B). When the amount is less than 0.5 part by weight, blowing is insufficient. When the amount is more than 15 parts by weight, degree of blowing is not increased in proportion to the increase in said amount and such an amount is uneconomical.

In the foamable composition, as the heat-activation type hardener for epoxy resin, used as the component (E), there can be ordinary used hardeners which exhibit a hardening action when heated. There is preferred a hardener capable of generating heat in combination with the epoxy resin to give a peak temperature of 100°-200° C. As such a hardener, there can be mentioned, for example, dicyandiamide, 4,4'-diaminodiphenylsulfone, imidazole derivatives such as 2-n-heptadecylimidazole and the like, isophthalic acid dihydrazine, N,N-dialkylurea derivatives, N,N-dialkylthiourea derivatives, acid anhydrides such as tetrahydrophthalic anhydride and the like, isophoronediamine, m-phenylenediamine, N-aminoethylpiperazine, boron trifluoride complex compounds and trisdimethylaminomethylphenol.

These hardeners can be used alone or in combination of two or more. The amount of the hardener used is ordinarily selected in the range of 1-20 parts by weight per 100 parts by weight of the component (A) (epoxy resin). When the amount is less than 1 part by weight, hardening is insufficient and the resulting foamed material has insufficient regidity. When the amount is more than 20 parts by weight, the rigidity of the foamed material is not increased in proportion to the increase in the amount and such an amount is uneconomical.

The hardening temperature referred to herein indicates a temperature of a heating mediufn when a mixture of an epoxy resin and a hardener (their mixing is made at room temperature) is subjected to temperature elevation using an oil bath, a heater or the like, thereby is hardened, generates a heat, and reaches a peak temperature. The preferable epoxy resin/hardener combination and amounts thereof selected so as to meet the heating conditions, can be easily determined in advance by conducting a preliminary test.

In the present invention, there can be used, as necessary, together with the component (E) (hardener), a hardening accelerator such as alcohol type, phenol type, mercaptan type, dimethylurea type, alicyclic type, imidazole, monuron, chlorotoluene or the like.

The foamable composition can contain, as necessary, besides the above essential components, a filler (e.g. calcium carbonate, talc, clay), a heat stabilizer, a foam modulator, a coloring agent, etc. Ordinarily, the filler is added in an amount of 0-200 parts by weight per 200 parts by weight of the component (B); the heat stabilizer in amount of 0-10 parts by weight; and the foam modulator in an amount of 0-10 parts by weight. When the amount of the filler is more than 200 parts by weight, the fineness of foam is lost and the expansion ratio is low. When the amounts of the heat stabilizer and the foam modulator are each more than 10 parts by weight, there is obtained no further increase in effect due to increase in amount.

The foamable composition can be prepared by kneading required amounts of a component (A), a component (B), a component (C), a component (D), a component (E) and, as necessary, various additives using a known kneader such as planetary mixer, kneader, rolls, Henschel mixer or the like.

The panel-reinforcing sheet material of the present invention includes a sheet material having a two-layered structure consisting of a first layer which is the above-prepared foamable composition and a second layer which is a fiber-made cloth, and a sheet material having a three-layered structure consisting of the same first layer, the same second layer and a third layer which is a thin metal film of 50 $\mu$m or less in thickness.

The fiber-made cloth used as the second layer has no particular restriction, and there can be used any of, for example, an organic or inorganic fiber-made fabric and a net-like, cloth-like, film-like or mat-like material obtained by bonding short fibers with a binder. A material which is resistant in the heating step, is desirable. Also, a material having a thickness of 1 mm or less is preferable. A material which is deformed or gives rise to shrinkage during the heating step, is unable to give a flat surface. A material of more than 1 mm in thickness allows the resulting sheet material to have a large weight or volume, reducing workability. As the heat-resistant fiber, there can be mentioned fibers of cotton, polyester, nylon, polyamide, carbon, glass, metal, etc. Of these, a glass fiber is particularly preferable in view of the workability and properties.

The thin metal film used as the third layer is a planar substrate for supporting the foamable composition. The thin metal film is to endow the composition with improved workability (e.g. easier coating, easier transportion, easier attaching to metal panel) and to allow the foamed panel to have increased surface strength and increased barrier property. Hence, the think metal film is desired to have properties such as rigidity, no expansion had no shrinkage, flexibility, lightweightness and the like. As such, there can be used metal foils of 50 $\mu$m or less in thickness, for example, foils of aluminum, stainless steel, zinc, tin, nickel, copper, iron, etc. Of these, aluminum foil is particularly preferable in view of the lightweightness, ductility and economy. When the thickness of the thin metal film is larger than 50 $\mu$m, the resulting sheet material has a large weight and low flexibility, and therefore does not well fit to curved surfaces, making it difficult to obtain a foamed material of uniform thickness.

When the foamable composition is a liquid, the panel-reinforcing sheet material of the present invention can be produced by, for example, (1) a method which comprises coating said foamable composition directly on a fiber-made cloth or on the cloth side of a laminate of a fiber-made cloth and a thin metal film and then heating the resulting material at a temperature lower than the decomposition temperature of a blowing agent contained in the foamable composition, to give rise to solidification, or (2) a method which comprises continuously heating said foamable composition on a release paper or a steel belt to obtain a sheet and then attaching thereto a fiber-made cloth or a fiber-made cloth and a thin metal film to obtain a laminate. When the foamable composition is a solid, the panel-reinforcing sheet material can be produced by, for example, (3) a method which comprises molding the foamable composition into a film by calendering, extrusion or the like and then attaching thereto a fiber-made cloth or a fiber-made cloth and a thin metal film by pressure or with an adhesive to obtained a laminate, or (4) a method which comprises adding an appropriate solvent to the foamable composition to obtain a liquid, then coating the liquid on a fiber-made cloth or on the cloth side of a laminate of a fiber-made cloth and a thin metal film, and evaporating the solvent to obtain a sheet.

Of these methods, the methods (1) and (3) are preferable. The foamable composition may have a release paper on the surface, as necessary.

The thus obtained panel-reinforcing sheet material of the present invention has high elasticity and is flexible, making easy its rolling-up, cutting and transportion.

The vehicle outer panel structure is produced by attaching the panel-reinforcing sheet material to the back side of a vehicle outer panel so that the first layer (the foamable composition layer) of the sheet material contacts with the back side and then heating the resulting structure to allow the sheet material to give rise to blowing and hardening.

The foamable composition layer side of the present panel-reinforcing sheet material has self-adhesive property and can be easily adhered to the back side of a vehicle outer panel by simple pressing, without requiring any adhesion treatment or adhesive. This is presumed to be because the portion of the epoxy resin not absorbed by the rubber elastomer and/or the themoplastic resin during the sheeting step remains in the obtained sheet and this epoxy resin portion shows adhesion. As a matter of course, it is possible to add to the foamable composition a tackifier other than the epoxy resin, in order to endow the foamable composition with higher adhesion. It is also possible to apply an adhesive to the surface of the sheet material or to the outer panel. As compared with the conventional case wherein a heat-insulating material such as foamed shaped material, felt or the like is attached with a self-adhesive or an adhesive, attaching can be conducted very easily by simply press-bonding a think flexible sheet to a vehicle outer panel and, moreover, uniform attaching of the sheet onto the whole surfaces of panels of various shapes is possible.

The outer panel to which back side the reinforcing sheet material has been attached as above, is heated in a heating furnace or the like at a temperature of about 180°-220° C., whereby the sheet material gives rise to blowing and hardening and an outer panel structure of the present invention improved in heat insulation and strength is obtained.

The mechanism of the above blowing and hardening is presumed to be as follows when an organic blowing agent is used. That is, first the component (B) (rubber elastomer and/or thermoplastic resin) is melted by heating; then, the blowing agent is decomposed to generate a gas. This gas generation invites blowing and foam cell generation (i.e., formation of a foamed material); subsequently, the hardener is activated, which invites a hardening reaction of the epoxy resin dispersed in the composition, whereby the foamed material is hardened. Thus, the properties of the foamed material are influenced by the gelation rate of the component (B), the decomposition rate of the blowing agent and the hardening rate of the epoxy resin; therefore, the components of the foamable composition must be selected depending upon desired foam cell density and hardening degree.

As the heating furnace used for heating the vehicle outer panel to which back side the reinforcing sheet material has been attached, an existing paint drying furnace is most reasonable. The paint drying furnace is largely divided into three types, i.e., an electrodeposit curing furnace, a middle coat curing furnace and a top coat curing furnace. In the present invention, an electrodeposit curing furnace is preferably used because the sheet material is attached to an outer panel before electrodeposition.

The panel-reinforcing sheet material of the present invention has excellent adhesion to oily surfaces, can be easily adhered to outer panels without requiring any adhesion treatment or adhesive, and gives a foamed hardened sheet excellent in heat insulation, rigidity and heat resistance. Therefore, the present sheet material, unlike conventional sheet materials using a vinyl chloride resin as a base, can be suitably used for reinforcement of vehicle outer panels before electrodeposition, in particular.

When the reinforcing sheet material of the present invention is applied to vehicle outer panels before electrodeposition, the sheet material can be applied to many sites and its blowing and hardening can be conducted with the same heat as used for electrodeposition; hence, the productivity in automobile production line can be enhanced.

The present invention is hereinafter described in more detail. The present invention, however, is by no means restricted by these Examples.

BRIEF DESCRIPTION OF THE DRAWING

The accompanying drawing.

Figure 1:
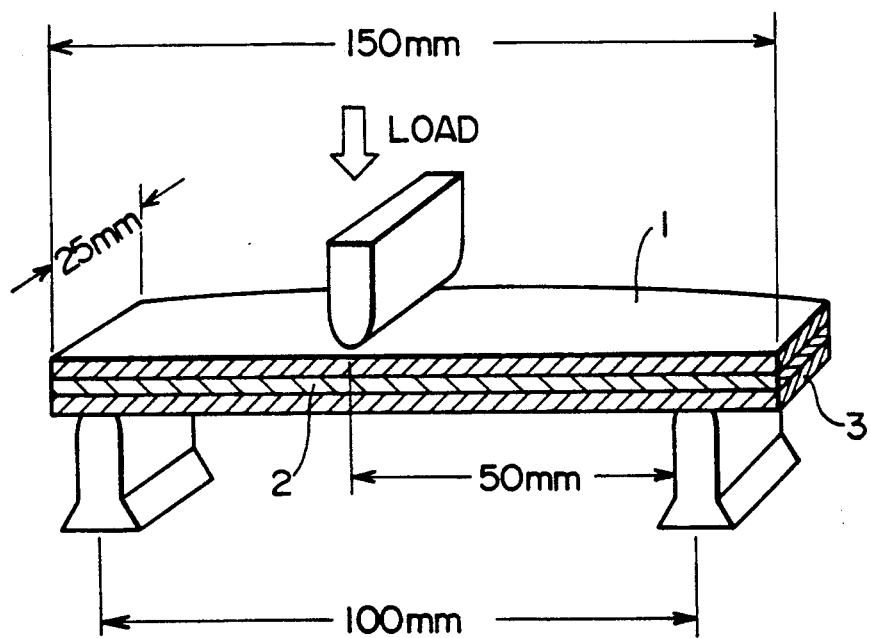
FIG. 1, is a perspective view explaining the methods for measuring the flexural strength at 1 mm deflection and the flexural displacement at peak load of each steel plate-resin composite sample, used in Examples.

Properties were evaluated as follows.

(1) Adhesion to oily surface

An unfoamed adhesive sheet was heated at 110° C. for 3 minutes and the press-bonded to a steel plate at a load of 3 kg at room temperature for 10 seconds. The resulting sample was measured for 180° C. peeling strength.

(2) Flexural strength at 1 mm deflection

A sample was measured for a load (kgf) applied when subjected to 1 mm deflection by the method shown in FIG. 1. In FIG. 1, 1 is a steel plate; 2 is a foamed hardened sheet; and 3 is a glass-fiber cloth.

(3) Flexural displacement at peak load

A sample was measured for a flexural displacement (mm) when subjected to yielding by a load applied, by the method shown in FIG. 1.

(4) Expansion ratio

Was determined by dividing the thickness of foam layer by the thickness of foamable composition layer.

Incidentally, the flexural strength at 1 mm deflection and flexural displacement at peak load of the steel plate (0.8 mm in thickness) used were 1.0 kgs and 26 mm, respectively.

The following materials were used as individual components of each foamable composition.

Acrylic paste resin

Zeon R-20 (a polymethyl methacrylate) manufactured by Nippon Zeon Co., Ltd., having an average particle diameter of about 1 µm and an average molecular weight of about 300,000.

Vinyl chloride resin

Zeon 47 manufactured by Nippon Zeon Co., Ltd. having an average particle diameter of about 1 µm and an average polymerization degree of about 800.

Epoxy-modified NBR (viscous liquid)

R-1415-1 having an epoxy equivalent of 400, manufactured by A.C.R. K.K.

Plasticizer

Dioctyl phthalate (DOP) manufactured by Sanken Kako K.K.

Liquid epoxy resin

Epicoat 828 manufactured by Yuka Shell Epoxy K.K.

Hardener for epoxy resin

Dicyanidiamide manufactured by Nippon Carbide Industries, Inc.

Hardening accelerator for epoxy resin

D.P. Hardener manufactured by Maruwa Biochemical K.K.

Organic blowing agent

AZ-H manufactured by Ohtsuka Chemical Co.

Foam cell modulator

BAP-1 manufactured by ASAHI DENKA KOGYO K.K.

Blowing accelerator

FL-23 manufactured by ASAHI DENKA KOGYO K.K.

Filler

Whiton H manufactured by Shiraishi Kogyo Kaisha, Ltd.

EXAMPLES 1-7 AND COMPARATIVE EXAMPLES 1-2

Components of types and amounts shown in Table 1 were kneaded in one portion at room temperature using a planetary mixer, to prepare foamable compositions. Each composition was coated on a glass-fiber cloth of 300 μm in thickness, in a thickness of 1.0 mm using a knife coater. The resulting material was heated for 3 minutes in a circulating hot air oven of 110° C. to prepare unfoamed adhesive sheets (panel-reinforcing sheet materials).

Each of the unfoamed adhesive sheets was press-bonded to a steel plate with an oily surface, of 0.8 mm in thickness at a load of 3 kg for 10 seconds. The resulting material was heated for 30 minutes in a circulating hot air oven of 180° C. (150° C. in Comparative Example 1) to prepare steel plate-resin composite samples each containing a hard foamed sheet with a glass-fiber cloth.

The sizes of the steel plate and the unfoamed adhesive sheets were all 150 mm×25 mm.

The unfoamed adhesive sheets were measured for adhesion to oily surface, and the steel plate-resin composite samples were measured for various properties. The results are shown in Table 1.

TABLE 1

| | | Example | | | | | | | Comparative Example | |
|---|---|---|---|---|---|---|---|---|---|---|
| | | 1 | 2 | 3 | 4 | 5 | 6 | 7 | 1 | 7 |
| Formulation of foamable composition (parts by weight) | Acrylic paste resin | 100 | 100 | 100 | 100 | 100 | 100 | — | — | — |
| | Epoxy-modified NBR | — | — | — | — | — | — | 100 | — | — |
| | Vinyl chloride resin | — | — | — | — | — | — | — | 100 | 100 |
| | Plasticizer (DOP) | 50 | 50 | 50 | 50 | 50 | 50 | 50 | 50 | 50 |
| | Liquid epoxy resin | 20 | 50 | 100 | 150 | 200 | 300 | 150 | 150 | 100 |
| | Hardener (dicyandiamide) | 2 | 5 | 10 | 20 | 25 | 35 | 20 | 10 | 10 |
| | Hardening accelerator (D.P. hardender) | 0.6 | 1.5 | 3 | 4.5 | 6 | 9 | 4.5 | 3 | 3 |
| | Organic blowing agent (AZ-H) | 3 | 4 | 5 | 3 | 7 | 9 | 3 | 5 | 5 |
| | Foam cell modulator (BAP-1) | — | — | — | — | — | — | — | 2 | 2 |
| | Blowing accelerator (FL-23) | 2 | 2 | 2 | 2 | 2 | 2 | 2 | 2 | 2 |
| | Filler (Whiton H) | 30 | 30 | 30 | 30 | 30 | 30 | 30 | 30 | 30 |
| Evaluation | Adhesion to oily surface (g/cm$^2$) | 40 | 100 | 180 | 290 | 360 | 420 | 320 | <10 | <10 |
| | Flexural strength at 1 mm deflection (kgf) | 2.0 | 2.4 | 2.9 | 3.6 | 4.5 | 5.2 | 3.3 | 2.8 | — |
| | Flexural displacement at peak load (mm) | 20 | 18 | 15 | 13 | 10 | 6 | 15 | 12 | — |
| | Thermal conductivity (Kcal/m · h · °C.) | 0.042 | 0.041 | 0.043 | 0.041 | 0.043 | 0.044 | 0.044 | 0.035 | — |
| | Expansion ratio (times) | 2.9 | 3.2 | 4.1 | 4.5 | 4.6 | 4.5 | 4.7 | 6.1 | — |
| | Condition of foam cells | Good | Good | Good | Good | Good | Good | Good | Good | Large[1)] |

Note:
[1)]Thermal decomposition took place

As is clear from Table 1, the panel-reinforcing sheet materials (the unfoamed adhesive sheets) of the present invention have excellent adhesion to oily surfaces, and the vehicle outer panel structures (the steel plate-resin composites) obtained therefrom are good in all of flexural strength at 1 mm deflection, flexural displacement at peak load, thermal conductivity, expansion ratio and foam cell condition.

We claim:

1. A panel-reinforcing sheet material having a two-layered structure consisting of a first layer and a second layer, the first layer consisting of a foamable composition comprising, as essential components, (A) an epoxy resin, (B) at least one substance selected from a rubber elastomer insoluble in the epoxy resin at room temperature but miscible with the epoxy resin at temperatures of 80°–150° C. to form a dispersion and a halogen-free powdery thermoplastic resin of 150 μm or less in average particle diameter insoluble in the epoxy resin at room temperature but miscible with the epoxy resin at temperatures of 80°–150° C. to form a dispersion, (C) a plasticizer, (D) a high-temperature-decomposition type blowing agent and (E) a heat-activation type hardener for epoxy resin, the component (A)/component (B) weight ratio being 0.2–5, and the second layer consisting of a fiber-made cloth.

2. A panel-reinforcing sheet material having a three-layered structure consisting of a first layer, a second layer and a third layer, the first layer consisting of a foamable composition comprising, as essential components, (A) an epoxy resin, (B) at least one substance selected from a rubber elastomer insoluble in the epoxy resin at room temperature but miscible with the epoxy resin at temperatures of 80°–150° C. to form a dispersion and a halogen-free powdery thermoplastic resin of 150 μm or less in average particle diameter insoluble in the epoxy resin at room temperature but miscible with the epoxy resin at temperatures of 80°–150° C. to form a dispersion, (C) a plasticizer, (D) a high-temperature-decomposition type blowing agent and (E) a heat-activation type hardener for epoxy resin, the component (A)/component (B) weight ratio being 0.2–5, the second layer consisting of a fiber-made cloth, and the third layer consisting of a thin metal film of 50 μm or less in thickness.

3. A vehicle outer panel structure which is produced by attaching a panel-reinforcing sheet material of claim 1 or 2 to the back side of a vehicle outer panel so that the first layer of the sheet material contacts with the back side and then heating the resulting structure to allow the sheet material to give rise to blowing and hardening.

* * * * *